H. A. KIMBALL.
Chuck.
No. 169,007.
Patented Oct. 19, 1875.
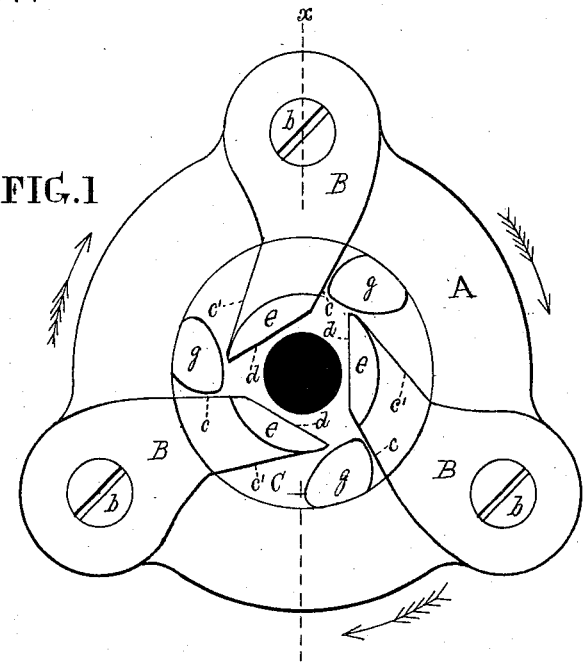
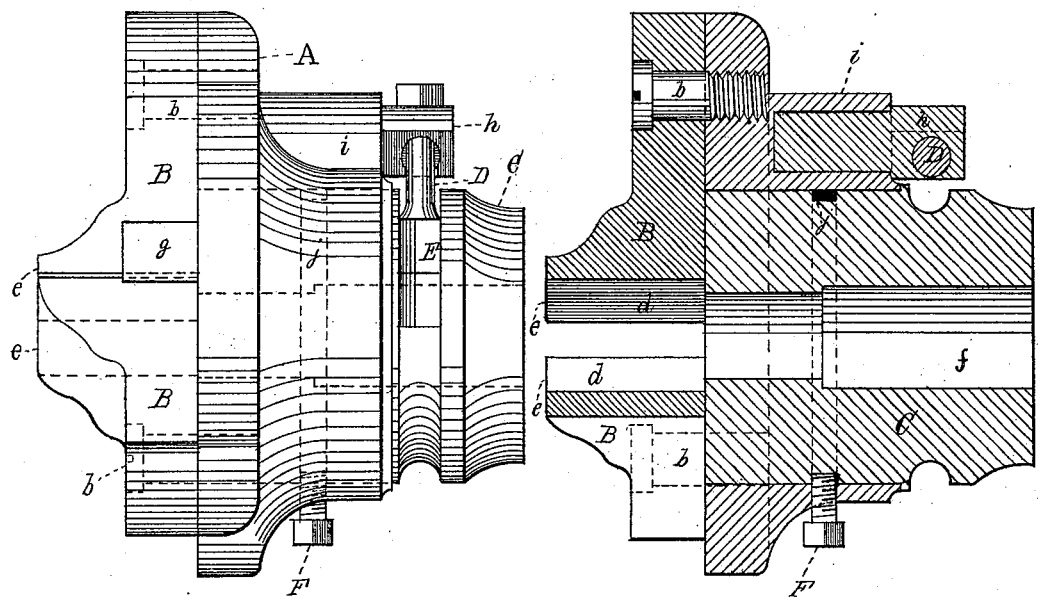
Witnesses.
Thomas P. Dewly.
Geo. C. Hetzel.
Inventor.
Hiram A. Kimball
Stephen Usich, Attorney

UNITED STATES PATENT OFFICE.

HIRAM A. KIMBALL, OF PHILADELPHIA, PENNSYLVANIA.

IMPROVEMENT IN CHUCKS.

Specification forming part of Letters Patent No. 169,007, dated October 19, 1875; application filed June 1, 1875.

*To all whom it may concern:*

Be it known that I, HIRAM A. KIMBALL, of the city and county of Philadelphia, in the State of Pennsylvania, have invented an Improvement in Universal Chucks, of which the following is a specification:

My invention consists in the combination of a carrier-plate, having clamping-levers and a forcing-screw, with a chuck-stock provided with lugs for operating the levers when the carrier-plate is turned partly around, and with a rack with which the screw operates to complete the clamping of the levers, as hereinafter set forth.

In the accompanying drawings, Figure 1 is a face view of my improved chuck. Fig. 2 is a side view of the same. Fig. 3 is a longitudinal section, taken at the line $x\ x$ of Fig. 1.

Like letters of reference in all the figures indicate the same parts.

A is a carrier-plate, which is provided with clamping-levers B B B, hung, by means of pivots $b\ b\ b$, to the plate A. The pivots are equidistant from the center of the plate, and also equidistant from each other. The levers are all precisely alike as to the form of their edges $c$ and $c'$ and the serrated faces $d$ of the clamping-jaws $e$, for the purpose hereinafter described. The faces of the jaws are serrated, to prevent the slipping of the rod or other article to be turned. C is the chuck-stock, with which the plate A is connected. It has a bore, $f$, for connecting it with the lathe-mandrel; and on its front end lugs $g\ g\ g$, for operating the levers B, the curved edges $c$ of the levers bearing against the lugs when the plate A is turned partly around in the direction of the arrows, whereby the jaws $e$ are brought into their open position (represented in Fig. 1) for the reception of the rod or other article to be turned.

For clamping the rod the plate is turned in the opposite direction, whereby the opposite edges of the levers are caused to bear against the lugs, and thereby move the jaws toward the center of the plate A until they press upon the rod. The jaws are then forced more tightly upon the rod by means of the screw D in the pivot $h$, which turns freely in the lug $i$ of the plate A. The forward end of the screw is brought into connection with the rack E, which is cut in the periphery of the stock C. The screw is then turned tight enough to complete the clamping process.

For some purposes it may be better to reverse the order of the edges of the levers; but this may be done in adaptation to the uses of the chuck without departing from the principles of the invention.

By having the levers B and lugs $g$ each of uniform construction, and arranged alike in relation to each other and to the center of the carrier-plate A, as described above, the device cannot fail to accurately chuck a rod of any size.

The longitudinal movement of the carrier-plate A upon the stock C is prevented by means of the point of the screw F, (which is connected with the hub of the carrier,) entering the annular groove $j$ in the periphery of the stock.

I claim as my invention—

The combination of the chuck-stock C, having lugs $g$ and rack E, with the carrier-plate A, having clamping-levers B and the forcing-screw D, substantially as and for the purpose set forth.

HIRAM A. KIMBALL.

Witnesses:
 THOMAS J. BEWLEY,
 STEPHEN USTICK.